3,421,187
PLASTIC CLIP
Francis E. Ryder, Des Plaines, Ill., assignor to Illinois Tool Works Inc., Chicago, Ill., a corporation of Delaware
Filed Oct. 13, 1966, Ser. No. 586,514
U.S. Cl. 24—81                    5 Claims
Int. Cl. A44b 21/00

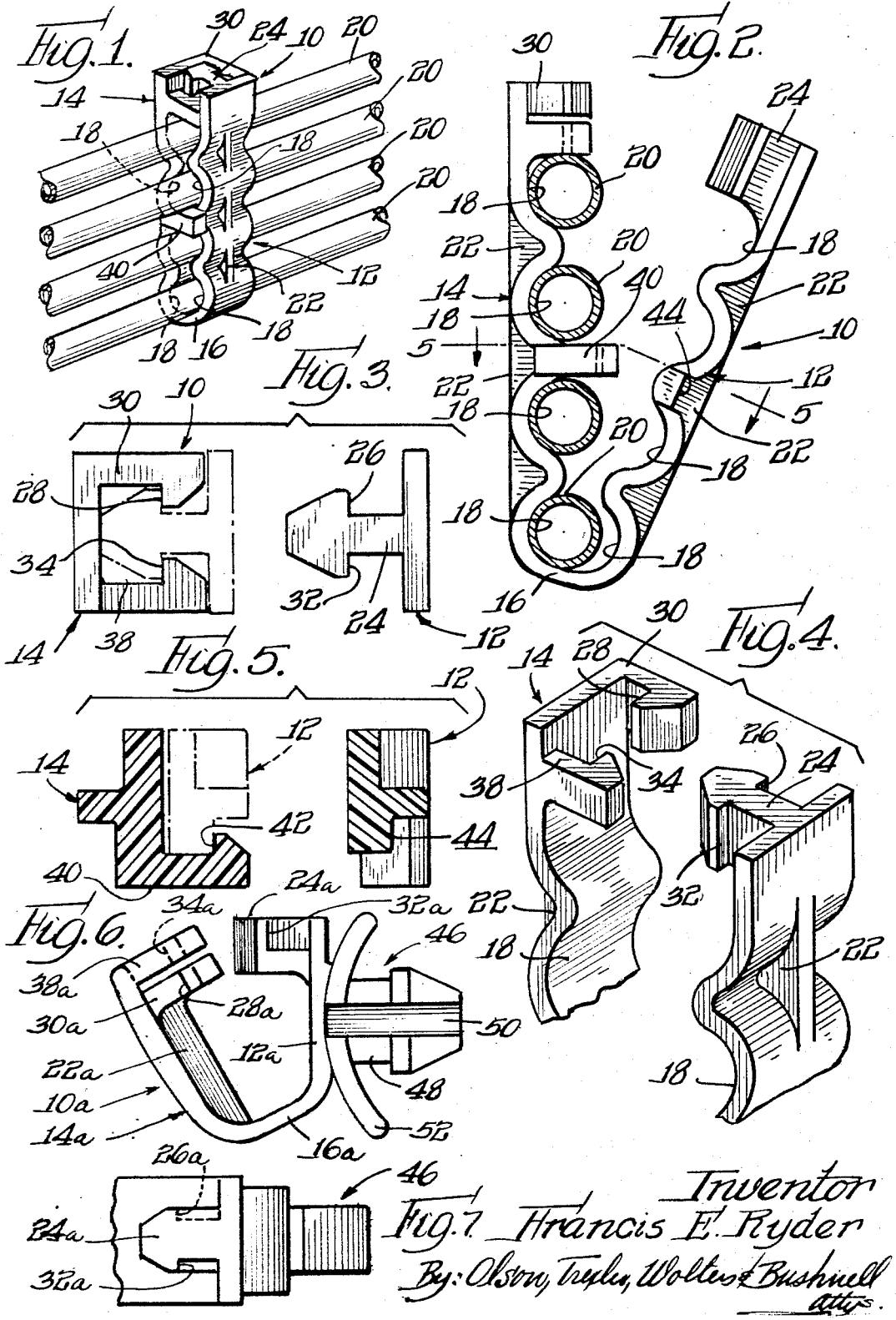

ABSTRACT OF THE DISCLOSURE

This invention relates generally to plastic clips and more particularly to improvements in plastic clips adapted to accommodate and maintain in predetermined spaced relationship simultaneously a plurality of elongated work elements such as conduits, electrical conductors and the like. The embodiments of the invention disclosed herein include a one-piece plastic member having a pair of elongated arms hingedly coupled at one extremity to permit said arms to be moved into juxtaposition, the facing surfaces of said arms presenting a discrete aperture or recess conforming substantially in shape with the elongate elements to be accommodated thereby, the freee extremities of said arms providing a novel snap-type fastener means in the form of a stud and a pair of spaced arms for receiving said stud extending toward each other and having shoulders adapted to be interlocked in response to pressure applied laterally of said arms.

---

More specifically, the invention contemplates the provision of clips of practical and novel one piece design which may be produced at minimum cost, and to this end the invention contemplates clips which may be produced by practicing conventional plastic molding methods.

A further object of this invention is to produce a plastic clip of the type referred to above which, because of its design and inherent resiliency will serve to grip circumferentially extensive surface areas of the work element accommodated thereby.

Still more specifically, the invention contemplates the novel and highly practical clip structure referred to above which will become locked in gripping relation with respect to elongated work elements accommodated thereby, by the simple expediency of pressing oppositely disposed sections of the clip toward each other. In other words, as the clip elements are finally pressed in position upon the associated work elements they will automatically snap into interlocking association so as to secure the clip against unauthorized removal or detachment from the work elements.

The foregoing and other objects and advantages will be more apparent from the following detailed description when considered in connection with the accompanying drawing, wherein:

FIG. 1 is a perspective view disclosing a clip of the present invention in operative association with a plurality of work elements;

FIG. 2 is a side elevational view of the clip of FIG. 1, with the elongated arms thereof spread apart in position to initially accommodate work elements such as conduits, electrical conductors and the like;

FIG. 3 is a plan view of the clip shown in FIG. 2;

FIG. 4 is a fragmentary perspective view of the upper portion of the clip arms in their separated relation as shown in FIG. 2;

FIG. 5 is a transverse sectional view taken substantially along the line 5—5 of FIG. 2;

FIG. 6 is a side elevational view of a clip of modified form; and

FIG. 7 is a fragmentary plan view of the clip shown in FIG. 6.

Referring now to the drawing, wherein like numerals have been employed to designate similar parts throughout the various figures, it will be seen that a clip which is representative of one embodiment of the present invention is designated generally by the numeral 10. The device 10 comprises a pair of elongated arms 12 and 14. These arms 12 and 14 are resiliently and hingedly connected at 16. The facing surfaces of the arms 12 and 14 are provided with arcuate work-accommodating surface sections 18.

These surface sections 18 are shaped to conform with the periphery of the elongated work elements they are to accommodate. Thus when the arms 12 and 14 are moved into juxtaposition as shown in FIG. 1, the surface section 18 on one arm cooperates with its complementary arcuate surface 18 on the opposite arm to present an aperture which conforms substantially with the cross-sectional shape of the work element 20, such as a conduit, electrical conductor or the like. In this position the cooperating surface sections 18 serve to grip the work elements 20 snugly. The clip 10 is preferably made of inherently resilient yet firm plastic material, preferably electrically non-conductive, and is capable of being produced in a mold by the practice of conventional molding methods. The inherent resilience of the plastic material cooperates to assure a very firm, snug, fit of the arcuate sections 18 against the work surface. In instances where increased lateral strength of the arms 12 and 14 is required, reinforcing ribs or elements 2 may be employed.

The ease with which the free extremities of the arms 12 and 14 may be interlocked is greatly facilitated by using the self-interlocking structure shown in the drawing. This interlocking structure or means consists of a stud 24 extending transversely from the medial area of the free extremity of the arm 12 which is provided with a shoulder 26 (FIG. 3). This shoulder 26 is adapted to interlock with a complementary shoulder 28 of a stud member 30, carried by the free extremity of the arm 14. This interlocking or engagement of the complementary shoulders 26 and 28 occurs when the free extremities of the arms 12 and 14 are pressed together so as to occupy the position show in FIG. 1. A second pair of interlocking shoulders 32 and 34 also function to secure the arms 12 and 14 against unauthorized separation. The shoulder 34 is provided on a stud 38 extending laterally from the arm 14, slightly below the plane of the stud 30. The shoulder 26 is formed integral with the stud 24, as clearly shown in FIG. 4. It has also been found advantageous in some applications to provide interlocking means located in the medial area of the arms 12 and 14. This medial or intermediate interlocking means consists of a stud 40 formed integral with and extending laterally from the arm 14, the stud 40 being provided with a latching shoulder 42. This shoulder 42 is adapted to interlock with a complementary shoulder 44 on the arm 12 as clearly shown in FIG. 5. This intermediate interlocking means becomes operative au'omatically as the arms 12 and 14 are pressed together so as to occupy the position shown in FIG. 1.

In FIGS. 6 and 7, a plastic clip is disclosed which is representative of a modified embodiment of the present invention. The clips 10 previously described are designed to accommodate a plurality of longitudinal workpieces, whereas the clip designated generally by the numeral 10a in FIG. 6 is designed to accommodate a single workpiece or a plurality of workpieces of relatively small diameter. The clip 10a differs also from the clip 10 in that it is formed integral with a fastener stud member designated generally by the numeral 46. The stud member 46 may be of conventional design, having a shank portion 48 which is longitudinally slotted at 50, and is provided with a resilient head portion 52 adapted to be pressed against a work surface after the shank 48 has been telescopically associated with a complementary aperture in a workpiece.

Referring now more specifically to the clip 10a, it will be noted that it incorporates an arm 12a adjacent to and formed integral with the fastener head 52 and a complementary arm 14a hingedly connected with the arm 12a at 16a. The arm 14a may be shifted toward and away from the arm 12a as a unit, and in order to lend rigidity to the arm 14a it is provided with a longitudinal reenforcing rib 22a.

The upper portions or extremities of the arms 12a and 14a are provided with self-interlocking structural elements consisting of a stud 24a formed integral and extending laterally with respect to the arm or support structure 12a. The stud 24a, like the stud 24 previously described, is provided with a shoulder 26a adapted to interlock with a complementary shoulder 28a of a stud member 30a. This interlocking or engagement of the complementary shoulders 26a and 28a occurs when the free extremities of the arms 12a and 14a are pressed together. A shoulder 32a is also provided on the stud 24a oppositely disposed from the shoulder 26a, and is adapted to interlock with a complementary shoulder 34a provided on a stud 38a. It will be noted that the stud 38a and its shoulder 34a are located in a plane spaced above the plane of the stud 24a and its complementary shoulder 28a. Particular attention is directed also to the fact that the shoulders 26a and 32a extend transversely over a partial extent of the stud 24a, as distinguished from the shoulders 26 and 32 of the previously described stud 24 which completely traverses the stud member 24. The arrangement of the stud member 24a, as shown in FIGS. 6 and 7, lends considerable transverse lateral strength to this area. This increase in stud strength and the provision of the strengthening or reenforcing rib 22a counteract tendencies for the interlocking shoulders to become inadvertently disengaged as the result of forces tending to twist the clip.

From the foregoing, it will be apparent that the present invention contemplates the provision of a very practical, low-cost and highly efficient clip for securing a single or a plurality of elongated workpieces in position. The simple one piece design of the clip makes it possible to produce such clips by conventional plastic molding methods. The electrically nonconductive characteristics of the clip make it readily adaptable for securing electrical conductors in position. Also, clips of the type contemplated by the present invention are equipped with work engaging or clamping surfaces shaped in accordance with the cross-sectional configuration of the workpiece. The size and shape of the work-gripping surface sections, such as the arcuate surface sections shown in the drawing, conform substantially with the peripheral surface of the workpieces to be accommodated thereby. The simple arrangement of the snap actuated interlocking means at the free extremity of the arms, as well as the interlocking means or latch mechanism positioned medially of the arms, greatly facilitates the ease with which the clip may be snapped in position upon a workpiece. It will also be apparent from the foregoing description that the invention contemplates a clip which may be snapped in position over a plurality of longitudinal workpieces as shown in FIGS. 1 and 2, or which may be used as a support on a panel or the like for securing one or more workpieces. By employing the simple expediency of a self-locking stud member as shown in FIG. 6, the clip may be mounted upon an apertured sheet or panel. Also in instances where the clip may be subjected to forces tending to twist the clip arms, and thus present the hazard of unauthorized disengagement of the interlocked arms, increased rigidity of the structure is required. By employing the reinforced stud and arm arrangement as shown in FIGS. 6 and 7, the possibility of disengagement resulting from twisting forces is reduced to a minimum. The clip is not only electrically nonconductive, but also resistant to corrosion which normally affects metallic fasteners and the like.

While for purposes of disclosure clips having specific structural features are illustrated and described herein, it should be understood that other modifications and changes are contemplated without departing from the spirit and scope of the appended claims.

The invention is claimed as follows:

1. A one-piece plastic clip for elongate work elements such as conductors and the like including a pair of integral elongated hingedly coupled arms providing facing surfaces, said surfaces including complementary shaped surface sections presenting a discrete aperture conforming substantially in shape to the elongate work elements to be accommodated thereby when the arms are adjacently positioned, and snap-type fastener means at the free extremities of said arms operable in response to pressure applied laterally of said arms for securing said extremities against subsequent unauthorized separation, said snap-type fastener means including a fastener element at the free extremity of each arm projecting laterally therefrom in facing relation to each other, said elements having cooperative interlocking shoulders for securing said arm extremities against unauthorized separation, the lateral extent of said fastener elements being such as to provide spacers for said arm extremities when said shoulders are interlocked, the interlocking means at the free extremity of the arms comprising a substantially unitary stud member on one arm having oppositely disposed locking shoulder means lying in a plane generally parallel to the plane of the arm free end and a pair of laterally spaced shank elements on the free end of the other arm which are longitudinally spaced from each other along the length of the other arm free end so as to lie in planes substantially parallel to each other and to the work elements being retained by the clip and having shoulder means each lying in a plane substantially parallel to the plane of the other arm free end adapted to snappingly interlock with the shoulder means on the stud member in response to pressure applied laterally of said arms, said stud member being of sufficient longitudinal length to lie in a plane traversing the parallel planes of the shank elements so as to prevent twisting of the interlocked free ends of the clip arms.

2. A plastic clip as set forth in claim 1, wherein interlocking means is provided at the intermediate portions of the arms for securing said portions against unauthorized separation.

3. A plastic clip as set forth in claim 1 wherein the cooperative interlocking shoulder means at the free extremities of the arms include yieldable shoulder supporting means.

4. A plastic clip for elongate work elements as set forth in claim 1 including fastener shank means extending therefrom for supporting the clip in an apertured work panel.

5. A plastic clip for elongate work elements as set forth in claim 1 wherein the arm having the pair of laterally spaced shank elements is provided with a longitudinal reenforcing rib.

References Cited

UNITED STATES PATENTS 2,144,755  1/1939  Freedman.

(Other references on following page)

| | | | |
|---|---|---|---|
| 3,074,675 | 1/1963 | Brown | 248—68 |
| 3,090,826 | 5/1963 | Cochran | 24—81.3 XR |
| 1,315,225 | 9/1919 | Hughes | 248—68 |
| 1,051,245 | 1/1913 | Marchal. | |
| 2,396,925 | 3/1946 | Morehouse | 248—68 |
| 3,050,578 | 8/1962 | Huebner. | |
| 3,088,702 | 5/1963 | Orenick et al. | |
| 3,204,636 | 9/1965 | Kariher et al. | 24—255 X |

FOREIGN PATENTS

| | | |
|---|---|---|
| 1,311,393 | 10/1962 | France. |
| 1,425,659 | 12/1965 | France. |
| 588,003 | 5/1947 | Great Britain. |
| 952,425 | 3/1964 | Great Britain. |

DONALD A. GRIFFIN, *Primary Examiner.*

U.S. Cl. X.R.

248—74